Feb. 10, 1959 C. D. MEE 2,873,319

MAGNETIC TAPE RECORDING AND REPRODUCING SYSTEM AND APPARATUS

Filed Aug. 7, 1956 2 Sheets-Sheet 1

Inventor
Charles Denis Mee
By Hooper, Leonard & Buell
Attorneys

Inventor
*Charles Denis Mee*

By *Hooper, Leonard & Bond*
Attorney

United States Patent Office 2,873,319

Patented Feb. 10, 1959

2,873,319

MAGNETIC TAPE RECORDING AND REPRODUCING SYSTEM AND APPARATUS

Charles Denis Mee, Langley, England, assignor to M. S. S. Recording Company Limited, Colnbrook, England, a British company Application August 7, 1956, Serial No. 602,531

2 Claims. (Cl. 179—100.2)

Figure 1:
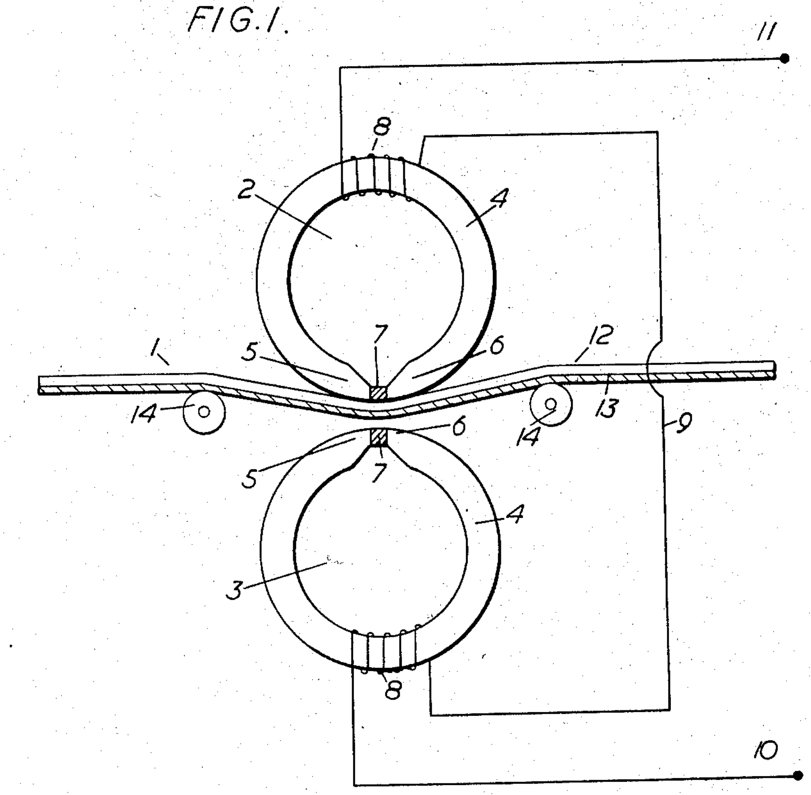

This invention is concerned with magnetic tape recording and reproducing systems, especially but not exclusively to systems in which data to be stored is in the form of trains of pulses. In this type of system it is usual to draw the tape across the gap between the two poles of a transducer head with its magnetic layer in contact with the poles of the head. The relation between the poles and the path of the tape is such that the portion of the tape extending across the gap is substantially parallel with the magnetic field and the tape is magnetised predominately along its length by the recorded signal. Particles of foreign matter or other irregularities on the surface of or in the tape may cause the magnetic layer of the tape which is in contact with the head to be displaced away from the gap and thereby result in a recorded or reproduced signal of diminished strength. The signal strength falls rapidly with relatively small displacement of the magnetic layer away from the gap and this may result in the decrease of the signal/noise ratio of the recording or reproducing system to an undesirable extent. To ensure reliability of recording and reproduction of a pulse train, to be applied, for instance, to automatic computers, it is important that the signal/noise ratio of the system shall not fall at any time below the value at which a pulse may be masked by the noise back-ground. The object of this invention is to provide an improved method and apparatus whereby the accuracy of recording and reproduction is not affected in that way by such non-uniformities in the tape.

In the improved system the tape is drawn between two similar, that is matched, transducer heads which are mounted with the gaps between the pairs of poles in alignment with one another, one on each side of the path of the tape. The two transducer windings are additively connected, in series or parallel, so that voltages induced in them during reproduction due to changes of magnetic flux in the tape between the gaps will not be in opposition. The magnetic surface of the tape is normally spaced from the gaps of both heads by a distance equal to or greater than the nominal thickness of the non-magnetic carrier layer of the tape.

Preferably the normal position of the magnetic layer of the tape is nearer one gap than the other, so that it is at one boundary of a region which is central between the gaps and across which the magnetic intensity does not vary beyond predetermined limits. These limits are determined by the permissible variation in recorded signal strength and usually by the permissible minimum strength. Preferably also the non-magnetic surface of the tape is in contact with one head. Appreciable displacements of the magnetic layer towards the gap in this head due to thin places in the non-magnetic layer of the tape are unlikely to be of frequent occurrence, but in the improved arrangement such displacements will not seriously affect the signal strength and will usually increase it, as will appear from the explanation given below.

In the improved apparatus there are arranged, in conjunction with the two transducer heads, guides for the tape which will under normal conditions maintain the magnetic portion of the tape spaced away from and at a predetermined position in the region between the gaps. In the preferred arrangement the width of the aperture for the passage of the tape between the transducer heads is at least equal to, and is usually greater than, the thickness of the magnetic portion plus twice the thickness of the non-magnetic portion of the tape and the guides are so arranged that the non-magnetic surface of the tape is always in contact with one of the heads.

Figure 2:
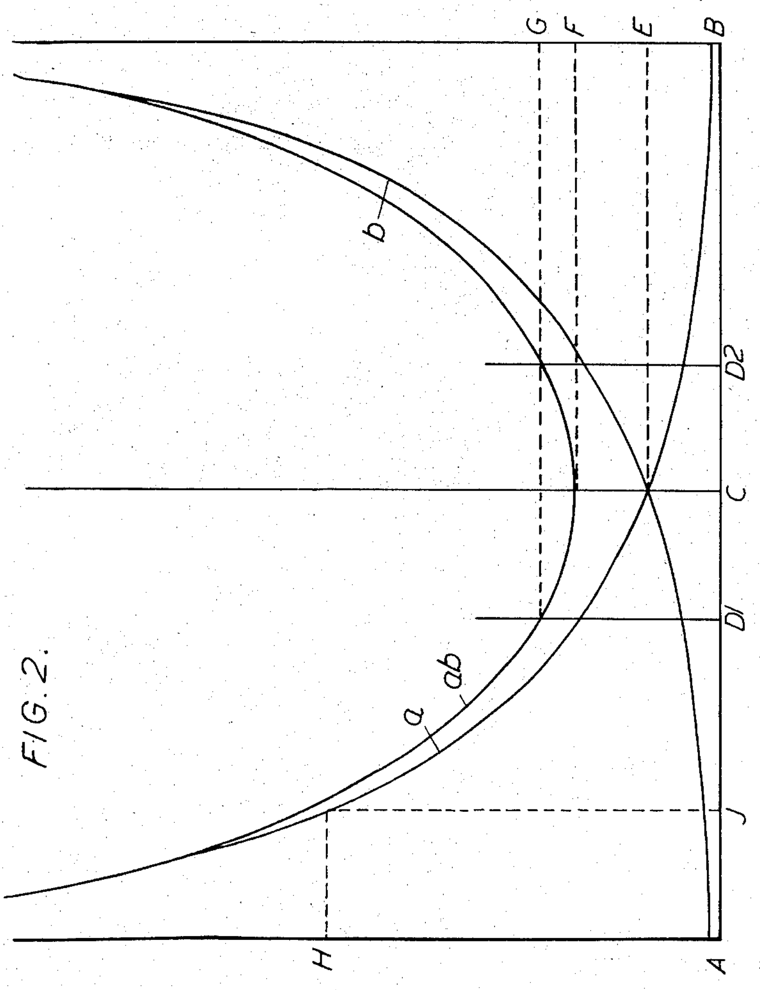

The invention will be further explained with reference, by way of example, to the accompanying drawings, wherein:

Figure 1 is a diagrammatic illustration of an arrangement in accordance with the invention, and Figure 2 is a graphical illustration of the distribution of magnetic intensity in the neighbourhood of a transducer head.

Referring first of all to Figure 1, there is shown a magnetic recording tape 1 in its path between two transducer heads 2 and 3. Each head comprises a C-shaped magnetic core 4 forming confronting pole pieces 5 and 6 which are separated by a non-magnetic gap defined by an insert 7 of non-magnetic material. The inserts will be referred to as the gaps 7. Each head includes a signal coil 8 and the two coils are connected in series, by a common connection 9, across two terminals 10 and 11. For the purpose of recording the input signals are applied to the terminals 10 and 11 and in the process of reproducing recorded signals the output is taken from these terminals. The heads 2 and 3 are so mounted that the gaps 7 are in alignment with one another, one on each side of the path of the tape 1. They are spaced apart, by an amount greater than and having a specific relation to the thickness of the tape 1. The heads are also so arranged that like poles of the cores are directly opposite to one another across the path of the tape. For instance the poles having the reference 5 in the drawing are of the same polarity. The tape 1 consists of a base layer 12 of flexible non-magnetic material having on one surface a continuous layer 13 of magnetic oxide. In its passage to and from the aperture between the gaps 7, 7, the tape 1 passes over two guides 14, 14, mounted one on the entry side and one on the exit side of the aperture. The arrangement of the guides 14 in relation to the heads 2, 3 is such that the tape 1 is deflected from a straight line path in its movement through the aperture, to maintain one side of the tape always in engagement with the head 2. Moreover it is so arranged that it is the non-magnetic base layer 12 of the tape which is in engagement with the head 2.

In order to obtain a result in accordance with the object of the invention the distance between the two gaps 7, 7, that is the width of the aperture through which the tape 1 passes, is made equal to or greater than the sum of the thickness of the magnetic oxide layer and twice the thickness of the non-magnetic layer. For example, with a magnetic oxide layer 13 of thickness 0.0005 inch on a non-magnetic base layer 12 of thickness 0.001 inch, one satisfactory width of the aperture is 0.003 inch.

Figure 2 illustrates the manner in which the magnetic intensity alters with displacement of the magnetic layer 13 of the tape away from the gap in a single transducer head or between gaps 7, 7 in an arrangement of two similar heads such as described above. The horizontal ordinate AB represents the distance between the two gaps 7, 7 and the vertical ordinates at A and B represent scales of magnetic intensity. The curve *a* represents the change in magnetic intensity across AB due to a single head positioned at A and the curve *b* represents a similar condition due to a single head positioned at B. The upper curve *ab* represents the combined effect of both heads, this curve being the sum of the curves *a* and *b*. Since this invention is concerned with both recording and reproducing, it is to be understood that by the term magnetic field intensity at any position on AB there is meant either the field intensity in that position due to the magnetisation of one or both heads, or the effect on one or both heads due to the degree of magnetisation of the tape in that position.

In the case of one head alone positioned at A the magnetic intensity varies exponentially so that if a tape running with its magnetic layer in contact with the head is displaced from it even by only a small amount the signal intensity will be considerably reduced. For instance, if the displacement is by the amount AJ, the intensity will be reduced to AH, that is a reduction of more than 50%. It will be seen that in the curve *ab* of magnetic intensity arising form two heads, there is a central region D1—D2 over which the curve is relatively shallow and symmetrical about a central position C of minimum intensity which coincides with the point E of intersection of the two curves *a* and *b*. If now the tape can be caused to run with its magnetic layer on the centre line C, any displacement can only be towards one head or the other so that the magnetic intensity will always increase. Furthermore, the change of signal strength due to this displacement will be considerably less than that resulting from a similar displacement in the region immediately adjacent to either of the heads. It will be seen from the graph that a displacement from the central position through a distance CD1, or CD2, equal to AJ, will alter the signal strength by about 20% as compared with the change of more than 50% above-mentioned.

Since it will usually be more convenient to run the tape with its non-magnetic surface in contact with one head, as in the case which has been described with reference to the accompanying diagrammatic drawing, the spacing between the heads can be so dimensioned in relation to the tape dimensions that the normal position of the magnetic layer is at the edge of the central region, such as D1—D2, which is nearest to that head. In such case, displacement of the magnetic layer away from the head will give rise to comparatively small reduction of signal strength, not exceeding that represented by GF, until the magnetic layer is in the central position C, and displacement beyond that central position will bring the magnetic layer immediately into a region in which the signal strength begins to rise again.

Where the dimensions are as already given by way of example, the distance AB is 0.003 in. If A represents the head 2 with which the non-magnetic layer 12 of the tape 1 is always in contact, the normal distance A–D1 of the central plane of the magnetic layer from A will be 0.00125 inch, that is the sum of the thickness (0.001 inch) of the non-magnetic portion 12 and half the thickness (0.0005 inch) of the magnetic portion 13 of the tape. The dimension of the central region D1—D2 is therefore 0.005 inch. Displacement of the magnetic layer through 0.00025 inch from its normal running position will bring it into the central position C between the heads, representing the reduction of the magnetic intensity to the minimum value. Any further displacement in the same sense will cause the intensity to rise again, until after a displacement of 0.0005 inch the value will be the same as when the tape is in its normal position. By using such an arrangement it has been found that with movement of the tape away from the head 2 by 0.00025 inch there occurs a loss of 0.5 decibel in the output signal and this loss disappears when the extent of the movement becomes 0.0005 inch.

Moreover, as will be apparent from the drawing, in the event of thinning of the non-magnetic layer of the tape causing the magnetic layer to be displaced away from the central region towards the head 2, the signal strength will always increase. As can be seen from the graph, the minimum output from the double-head system is lower than the output from a single head in contact with the magnetic layer. The reduction in output due to using the double head will depend on the wave length along the tape of the recorded signal. For the example quoted, of a tape with a non-magnetic layer thickness 0.001 inch and a magnetic layer thickness 0.0005 inch, the output from the double-head system is about 90% of that from a single head system for a recording of 100 pulses per inch of tape and about 40% for 200 pulses per inch.

In another arrangement, also given by way of example, the thickness of the non-magnetic part of the tape is 0.0015 inch, that of the magnetic layer is 0.0005 inch and the distance AB between the two heads is 0.0035 inch. Thus under normal conditions the magnetic layer is positioned exactly mid-way between the two heads and displacement towards either head can only increase the recorded or reproduced signal strength.

Thus, with the improved arrangement, by using two matched heads and appropriately selecting the distance between the gaps in the two heads in relation to the tape thickness and maintaining the non-magnetic side of the tape always in contact with one head so that the magnetic layer is normally positioned centrally between the gaps or nearer to the gap in that head, it is found that for small displacements a negligibly small change in intensity of the recorded or reproduced signals is experienced and larger displacements produce an increase in intensity. A second advantage of the improved system is that where, in the preferred form, the magnetic surface of the tape is not normally in contact with a transducer head, wear of the head is reduced as compared with the reverse arrangement.

What I claim as my invention is:

1. An electro-magnetic transducing instrument comprising a tape including a non-magnetic portion and, on one surface thereof, a layer of magnetic material, two similar transducer heads positioned one on each side of the tape and with their windings additively connected together, and spacer means maintaining the layer of magnetic material spaced from each head by a distance substantially equal to the thickness of the non-magnetic portion of said tape.

2. An electro-magnetic transducing instrument comprising a tape including a non-magnetic portion and, on one of the two major surfaces thereof, a layer of magnetic material, two similar transducer heads positioned one on each side of the tape and with their windings additively connected together, and spacer means comprising the non-magnetic position of the tape positioned with the layer of magnetic material on one surface of the tape spaced from one head by a distance substantially equal to the thickness of the non-magnetic position of the tape and with the other surface of the tape in contact with the other head.

References Cited in the file of this patent

UNITED STATES PATENTS

| | | |
|---|---|---|
| 2,484,568 | Howell | Oct. 11, 1949 |
| 2,488,717 | Eilenberger | Nov. 22, 1949 |
| 2,697,135 | Gratian | Dec. 14, 1954 |